April 12, 1932.  J. W. BRYCE  1,853,199
SEAL FOR SCALES
Filed June 19, 1928

Inventor
James W. Bryce
By his Attorney

Patented Apr. 12, 1932

1,853,199

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

SEAL FOR SCALES

Application filed June 19, 1928. Serial No. 286,651.

This invention relates to improvements in weighing scales.

In order to weigh accurately the scale members must retain the same physical characteristics as at the time the sealing adjustments were made. If the scale is used on locations where a great deal of moisture is in the air or where chemical vapors are given off, these foreign elements enter the scale housing and cause rusting and corrosion of the scale members, not only resulting in rapid deterioration of said members but changing their physical characteristics so as to destroy the sealing adjustments. The settling of dust on the scale members also causes inaccurate weighing.

The object of this invention is to provide an improved means for excluding dust, moisture, or other chemical vapors from certain scale members.

The object is further to provide dust and vapor excluding means which is equally effective when placed horizontally or vertically.

More specifically, the object of the invention is to provide a baffle plate arrangement for causing vapors and dust to settle thereon instead of on the scale members.

The invention is particularly useful in a scale having automatic counterbalancing means such as pendulum weights or springs and the object of the invention is still further to exclude foreign elements from the portion of the scale enclosing said automatic counterbalancing means.

Further and other objects and advantages will be hereinafter set forth in the accompanying specification and claims, and shown in the drawings, which by way of illustration show what is now considered to be the preferred embodiment of the invention.

Figure 2:
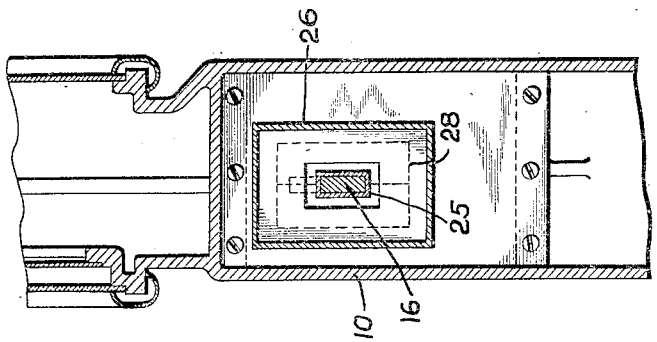
Fig. 2 is a section on line 2—2 of Fig. 1.
Figure 1:
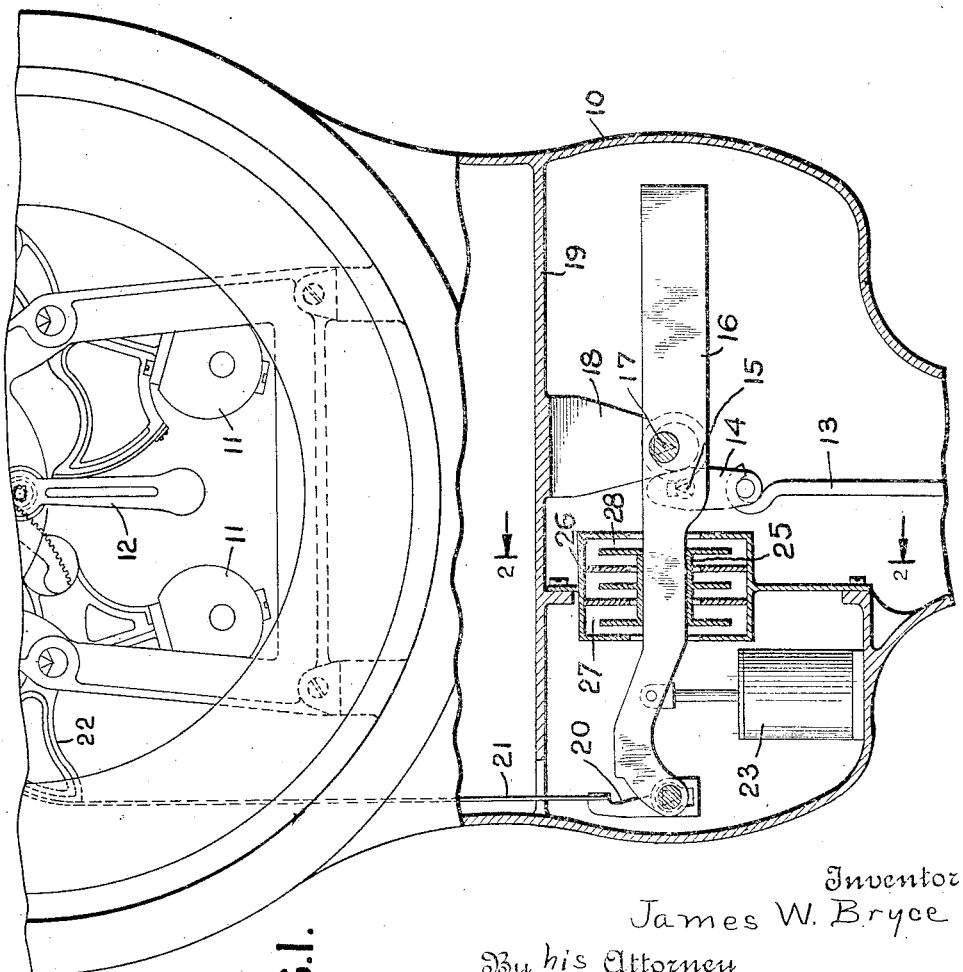
Fig. 1 is a side view, partly in section of the upper portion of a scale to which the present invention is applied.

Referring to the drawings in detail, 10 is the scale housing, the upper portion of which encloses the pendulums 11, the movement of which rotates an indicator 12 cooperating with a chart to indicate the load in a manner well known to the art. A draft rod 13 is connected at its lower end to the platform levers (not shown) and to a link 14 at its upper end. The link 14 bears on a knife edge 15 of a lever 16 fulcrumed on bearings 17 fixed in a depending extension 18 of a horizontal frame plate 19. At its left end, the lever 16 bears on a link 20 to which is fastened the lower end of the tape 21 connected at its other end to the pendulum cams 22. A dash pot 23 is connected to the left hand arm of lever 16 for damping the oscillations thereof.

When a load is placed on the platform (not shown) the draft rod 13 moves downwardly and rocks the lever 16 counterclockwise which through tape 21 actuates the pendulums to rotate the indicator 12.

In the instant case, it is desired to exclude vapors and dust from the tape 21 and the parts of the scale within the housing located above plate 19. For this purpose, the means for sealing out these foreign elements is applied to the lever 16 and comprises an air seal consisting of an inner member 25 fixed to the left arm of the lever and an outer member 26 fixed to the scale frame. The outer member has three chambers 27, each enclosing a baffle plate 28 rigid with the inner member 25. The walls of the chambers 27 form baffle plates which in combination with baffle plates 28 will force the air which may contain vapor and dust to take a circuitous route, causing the dust and vapor to settle on the baffle plates and the walls of the members 25 and 26. In effect, the circulation of air and gases contained therein, through members 25 and 26 due to the many reversals of direction, will be negligible and a dead air pocket will be formed inside these members. Hence, in addition to causing settling out of the vapors and dust in the air, the members 25 and 26 practically prevent passage of air and gases from one side of the members to the other. Member 26 covers the width of the interior of the housing 10 (as shown in Fig. 2) and tight joints are formed between said member and the frame parts to which it is attached.

The rocking of lever 16 is not interfered with by the air seal members as member 25 is movable within member 26.

Instead of applying the air seal to lever 16, it may be applied to a rectilinearly movable member such as draft rod 13 or tape 21.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore by the scope of the following claims:

1. A scale including enclosed automatic load counterbalancing means, a member below said means for actuating said means, means for moving said member in response to the load and an air seal between a part of said member and said counterbalancing means.

2. A scale comprising a housing, a load counterbalancing means of the pendulum type enclosed in said housing, a member in said housing for actuating said counterbalancing means, a horizontal partition in said housing between said counterbalancing means and said member and an air seal between a part of said member and said means.

3. A scale including automatic load counterbalancing means, a housing enclosing the same, a lever for actuating said counterbalancing means, said housing having an opening through which said lever passes, said housing completely enclosing the counterbalancing means except for said opening and an air seal applied to said opening for preventing passage of foreign elements into said housing.

4. A scale including automatic load counterbalancing means, a member for actuating said means, a connection between said member and said means, a housing for said means provided with an opening through which said connection passes, and an air seal comprising a baffle structure carried by said member and a coacting baffle structure carried by the connection, each baffle structure having a portion projecting between portions of the other baffle structure, the baffles forming an effective seal for exclusion of foreign matter between a part of said member and said connection.

5. A scale comprising automatic load counterbalancing means, a housing enclosing the same, a lever passing into said housing for actuating said means, a partition carried by said housing for isolating said counterbalancing means from said lever, and an air seal for excluding foreign elements from said housing, said seal comprising a baffle plate structure fixed to said lever and a cooperating baffle plate structure fixed to said housing.

6. A scale comprising automatic load counterbalancing means, a housing enclosing the same, a lever passing into said housing for actuating said means, a horizontal frame plate carried by said housing between said lever and counterbalancing means for isolating the latter from said lever and a plurality of cooperating baffle plates for excluding foreign elements from said housing.

7. A scale comprising automatic load counterbalancing means, a housing enclosing the same, the bottom of said housing comprising a horizontal frame plate, an element positioned below said plate for actuating said means, an opening in said plate, and an air seal located between said element and said opening for sealing the opening.

8. A scale comprising automatic load counterbalancing means, a housing enclosing said means, a horizontally disposed member for actuating said means, a horizontal frame plate carried by said housing for separating the counterbalancing means from said member and an air seal applied to said member for excluding vapor and dust from said housing.

9. A scale comprising load counterbalancing means, a housing enclosing the same, a horizontal partition on said housing substantially separating the counterbalancing means from the remaining scale elements, a vertical partition carried by said housing and joining the horizontal partition, and an air seal applied to said vertical partition to exclude vapor and dust from the housing.

10. A scale comprising automatic load counterbalancing means, a housing enclosing the same, a horizontally disposed member for actuating said means, said housing being provided with an opening through which said member passes, a baffle plate structure fixed to said member, and a second baffle plate structure fixed to the housing and enclosing the first-named baffle plate structure.

In testimony whereof I hereto affix my signature.

JAMES W. BRYCE.